United States Patent
Chujo et al.

(10) Patent No.: US 8,418,188 B2
(45) Date of Patent: Apr. 9, 2013

(54) TASK EXECUTION CONTROLLER AND RECORDING MEDIUM ON WHICH TASK EXECUTION CONTROL PROGRAM IS RECORDED

(75) Inventors: Naoya Chujo, Nagoya (JP); Masatoshi Kido, Nishikamo-gun (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 231 days.

(21) Appl. No.: 13/041,757

(22) Filed: Mar. 7, 2011

(65) Prior Publication Data

US 2011/0225595 A1    Sep. 15, 2011

(30) Foreign Application Priority Data

Mar. 11, 2010   (JP) .................................. 2010-054849

(51) Int. Cl.
   *G06F 9/46*   (2006.01)
(52) U.S. Cl. ......................... 718/106; 718/107
(58) Field of Classification Search ........................ None
   See application file for complete search history.

(56) References Cited

U.S. PATENT DOCUMENTS

| | | | | |
|---|---|---|---|---|
| 5,339,425 A | * | 8/1994 | Vanderah et al. ............. | 718/102 |
| 6,178,542 B1 | * | 1/2001 | Dave ............................. | 716/105 |
| 7,322,033 B2 | * | 1/2008 | Ito ................................. | 718/104 |
| 7,360,216 B2 | * | 4/2008 | Spoltore et al. ............... | 718/102 |
| 7,912,623 B2 | * | 3/2011 | Sugiyama et al. ............. | 701/103 |
| 2004/0216098 A1 | * | 10/2004 | Roe et al. ........................ | 717/161 |
| 2008/0316966 A1 | * | 12/2008 | Joshi et al. ..................... | 370/330 |
| 2009/0088924 A1 | * | 4/2009 | Coffee et al. .................... | 701/33 |
| 2011/0064090 A1 | * | 3/2011 | Berwanger et al. ........... | 370/442 |
| 2012/0224591 A1 | * | 9/2012 | Tsunedomi et al. .......... | 370/459 |

FOREIGN PATENT DOCUMENTS

| | | |
|---|---|---|
| JP | 10-228385 | 8/1998 |
| JP | 11-259311 | 9/1999 |
| JP | 2001-236236 | 8/2001 |
| JP | 2004-70582 | 3/2004 |
| JP | 2004-326679 | 11/2004 |
| JP | 2006-350653 | 12/2006 |

* cited by examiner

*Primary Examiner* — Emerson Puente
*Assistant Examiner* — Mehran Kamran
(74) *Attorney, Agent, or Firm* — Oblon, Spivak, McClelland, Maier & Neustadt, L.L.P.

(57) ABSTRACT

A slot calculation unit calculates a current slot number and stores it in a slot storage unit. When each of control tasks of a recognition processing portion, a vehicle speed calculation portion, a brake control portion, and a steering control portion is activated, a slot number at the time of output of an execution result used as input data is obtained from a task table storage unit, and it is determined whether a time constraint is violated based on a permissible slot number for the input data, stored in a constraint table storage unit. When an execution result of each control task is output, the stored current slot number is read, and it is determined whether a time constraint is violated based on a permissible slot number for the output of the execution result, stored in the constraint table storage unit.

8 Claims, 7 Drawing Sheets

(OUTPUT VALUE IS DETERMINED WHEN TASK IS ENDED)
(INPUT VALUE IS OBTAINED WHEN TASK IS STARTED)

TASK A

| | SLOT NUMBER |
|---|---|
| START-UP | 0 |
| INPUT | - |
| OUTPUT | 2 |

FIG. 3B

TASK B

| | |
|---|---|
| START-UP | 0 |
| INPUT | - |
| OUTPUT | 3 |

FIG. 3C

TASK C

| | |
|---|---|
| START-UP | 2 |
| INPUT 1 (OUTPUT A) | 4 |
| INPUT 2 (OUTPUT B) | 0 |
| OUTPUT | 2 |

FIG. 3D

TASK D

| | |
|---|---|
| START-UP | 3 |
| INPUT (OUTPUT B) | 0 |
| OUTPUT | 3 |

FIG. 4A

TASK A

| | SLOT NUMBER | SLOT NUMBER |
|---|---|---|
| START-UP | 0 | 3 |
| INPUT | − | − |
| OUTPUT | 1 | 4 |

FIG. 4B

TASK B

| | | | |
|---|---|---|---|
| START-UP | 0 | 2 | 4 |
| INPUT | − | − | − |
| OUTPUT | 0 | 2 | 4 |

FIG. 4C

TASK C

| | | |
|---|---|---|
| START-UP | 2 | 5 |
| INPUT 1 (OUTPUT A) | 1 | 4 |
| INPUT 2 (OUTPUT B) | 0.1 | 3.4 |
| OUTPUT | 3 | 0 |

FIG. 4D

TASK D

| | | | |
|---|---|---|---|
| START-UP | 1 | 3 | 5 |
| INPUT (OUTPUT B) | 0 | 2 | 4 |
| OUTPUT | 1 | 3 | 5 |

TASK EXECUTION CONTROLLER AND RECORDING MEDIUM ON WHICH TASK EXECUTION CONTROL PROGRAM IS RECORDED

INCORPORATION BY REFERENCE

The disclosure of Japanese Patent Application No. 2010-054849 filed on Mar. 11, 2010 including the specification, drawings and abstract is incorporated herein by reference in its entirety.

BACKGROUND OF THE INVENTION

1. Field of the Invention

The invention relates to a task execution controller and a recording medium on which the task execution control program is recorded. In particular, the invention relates to a task execution controller that executes a plurality of control tasks having different cycles in a multitasking manner, and a recording medium on which the task execution control program is recorded.

2. Description of the Related Art

As a real-time operating system that executes multitasking using a preemptive priority-based scheduling, there is a known real-time operating system that records an event occurrence time that is a designated activation time for a task, for which a permissible delay time has been set; calculates delay time based on the recorded event occurrence time and a time at which processing of the task that has been designated to be activated ends and the process returns to the user program; determines whether the calculated delay time exceeds the preset permissible delay time; and informs a user of the determination result (refer to, for example, Japanese Patent Application Publication No. 2006-350653).

However, in the technology described in Japanese Patent Application Publication No. 2006-350653, for each individual control task, it is necessary to obtain a current time and determine whether the calculated delay time exceeds the permissible delay time. If the time data is highly accurate, computation time of a process for obtaining the time data and computation time of a process for determining whether the calculated delay time exceeds the permissible delay time may be increased.

SUMMARY OF INVENTION

The invention provides a task execution controller and a recording medium on which a task execution control program is recorded, which make it possible to determine whether a time constraint is violated through simple processing.

A first aspect of the invention relates to a task execution controller in which a first control task and a second control task having different cycles are periodically executed based on input data in a multitasking manner, execution results of the first and second control tasks are respectively output, and the first control task is executed using the execution result of the second control task as the input data. The task execution controller includes: a slot number calculation unit that calculates a current slot number based on the number of slots which are obtained by dividing a time axis at predetermined time intervals, the number of the slots being set to a value obtained by dividing a least common multiple of the cycles of the first and second control tasks by a greatest common divisor of the cycles of the first and second control tasks and then multiplying a result of division by a natural number n, and that stores the calculated current slot number in a first memory; an output-time slot number storing unit that reads the current slot number stored in the first memory when each of the execution results of the first and second control tasks is output, and stores the read slot number in a second memory as a slot number at time of output of the execution result; and a determination unit that obtains, when the first control task that requires the execution result of the second control task as the input data is activated, the slot number at time of output of the execution result of the second control task from the second memory, and that determines whether a time constraint is violated based on the obtained slot number and an input constraint condition in which a permissible slot number for the input data for the first control task is set in advance.

A second aspect of the invention relates to a recording medium on which a program is recorded, the program causing a computer, in which a first control task and a second control task having different cycles are periodically executed based on input data in a multitasking manner, execution results of the first and second control tasks are respectively output, and the first control task is executed using the execution result of the second control task as the input data, to operate to: calculate a current slot number based on the number of slots which are obtained by dividing a time axis at predetermined time intervals, the number of the slots being set to a value obtained by dividing a least common multiple of the cycles of the first and second control tasks by a greatest common divisor of the cycles of the first and second control tasks and then multiplying a result of division by a natural number n, and store the calculated current slot number in a first memory; read the current slot number stored in the first memory when each of the execution results of the first and second control tasks is output, and store the read slot number in a second memory as a slot number at time of output of the execution result; and obtain, when the first control task that requires the execution result of the second control task as the input data is activated, the slot number at time of output of the execution result of the second control task from the second memory, and determine whether a time constraint is violated based on the obtained slot number and an input constraint condition in which a permissible slot number for the input data for the first control task is set in advance.

According to the first and second aspects described above, the current slot number is calculated based on the number of slots which are obtained by dividing the time axis at predetermined time intervals, the number of the slots being set to the value obtained by dividing the least common multiple of the cycles of the first and second control tasks by the greatest common divisor of the cycles of the first and second control tasks and then multiplying the result of division by the natural number n, and the calculated current slot number is stored in the first memory. The current slot number stored in the first memory is read, and the read slot number is stored in the second memory as the slot number when the execution result is output.

When the first control task that requires the execution result of the second control task as the input data is activated, the slot number at the time of output of the execution result of the second control task is obtained from the second memory, and it is determined whether the time constraint is violated based on the obtained slot number and the input constraint condition in which the permissible slot number for the input data for the first control task is set in advance.

As described above, it is possible to determine through simple processing whether the time constraint is violated based on the slot number when the execution result of the control task is output and the input constraint condition in which the permissible input slot number is set in advance.

A third aspect of the invention relates to a task execution controller in which a first control task and a second control task having different cycles are periodically executed based on input data in a multitasking manner, execution results of the first and second control tasks are respectively output, and the first control task is executed using the execution result of the second control task as the input data. The task execution controller includes: a slot number calculation unit that calculates a current slot number based on the number of slots which are obtained by dividing a time axis at predetermined time intervals, the number of the slots being set to a value obtained by dividing a least common multiple of the cycles of the first and second control tasks by a greatest common divisor of the cycles of the first and second control tasks and then multiplying a result of division by a natural number n, and that stores the calculated current slot number in a memory; and a determination unit that reads the current slot number stored in the memory when each of the execution results of the first and second control tasks is output, and that determines whether a time constraint is violated based on the read slot number and an output constraint condition in which a permissible slot number for the output of execution result of the control task is set in advance.

A fourth aspect of the invention relates to a recording medium on which a program is recorded, the program causing a computer, in which a first control task and a second control task having different cycles are periodically executed based on input data in a multitasking manner, execution results of the first and second control tasks are respectively output, and the first control task is executed using the execution result of the second control task as the input data, to operate to: calculate a current slot number based on the number of slots which are obtained by dividing a time axis at predetermined time intervals, the number of the slots being set to a value obtained by dividing a least common multiple of the cycles of the first and second control tasks by a greatest common divisor of the cycles of the first and second control tasks and then multiplying a result of division by a natural number n, and store the calculated current slot number in a memory; and read the current slot number stored in the memory when each of the execution results of the first and second control tasks is output, and determine whether a time constraint is violated based on the read slot number and an output constraint condition in which a permissible slot number for the output of execution result of the control task is set in advance.

According to the third and fourth aspects, the current slot number is calculated based on the number of slots which are obtained by dividing the time axis at predetermined time intervals, the number of the slots being set to the value obtained by dividing the least common multiple of the cycles of the first and second control tasks by the greatest common divisor of the cycles of the first and second control tasks and then multiplying the result of division by the natural number n, and the calculated current slot number is stored in the memory.

The current slot number stored in the memory is read when each of the execution results of the first and second control tasks is output, and it is determined whether the time constraint is violated based on the read slot number and the output constraint condition in which the permissible slot number for the output of execution result of the control task is set in advance.

As described above, it is possible to determine through simple processing whether the time constraint is violated based on the slot number when the execution result of the control task is output and the output constraint condition in which the permissible output-time slot number is set in advance.

In the determination unit according to the first aspect described above, the current slot number stored in the first memory may be read when each of the execution results of the first and second control tasks is output, and it may be determined whether the time constraint is violated based on the read slot number and the output constraint condition in which the permissible slot number for the output of the execution result of the control task is set in advance. Thus, it is possible to determine through simple processing whether the time constraint is violated based on the slot number when the execution result of the control task is output and the output constraint condition in which the permissible output-time slot number is set in advance.

In the aspects described above, there may be further provided an output unit that outputs a determination result when it is determined that the time constraint is violated. Thus, it is possible to inform a user of the occurrence of the time constraint violation.

As described above, with the task execution controller and the recording medium on which the program is recorded according the aspects of the invention, it is possible to determine through simple processing whether the time constraint is violated, based on the slot number when the execution result of the control task is output and the input constraint condition in which the permissible input slot number is set or based on the slot number when the execution result of the control task is output and the output constraint condition in which the permissible output-time slot number is set.

BRIEF DESCRIPTION OF DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, an example embodiment of the invention will be described in detail with reference to the accompanying drawings. Note that in the example embodiment, the invention is applied to an integrated control system that is installed in a vehicle.

Figure 1:
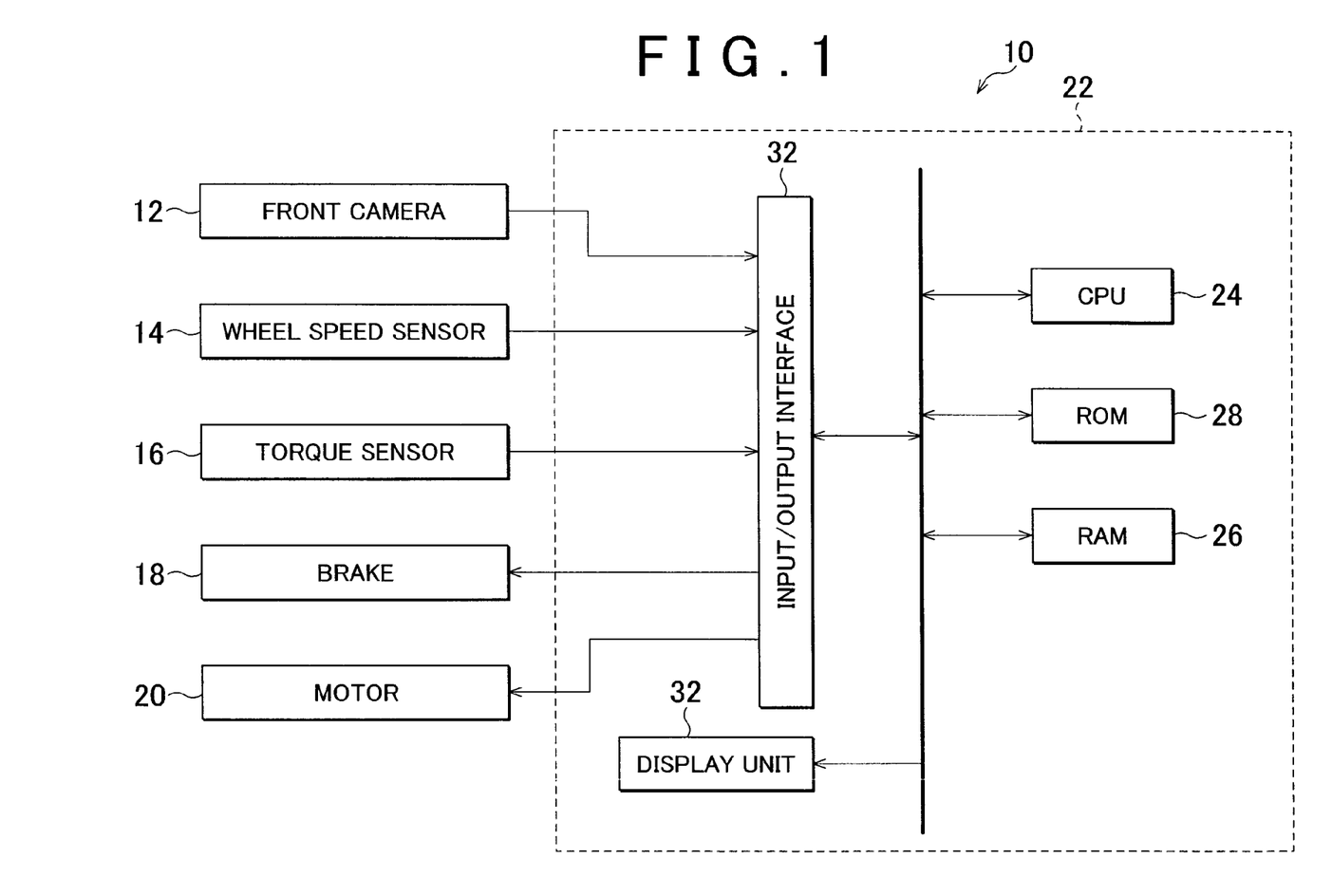
FIG. 1 is a schematic view showing the configuration of an integrated control system according to an embodiment of the invention.

As shown in FIG. 1, an integrated control system 10 according to the embodiment includes: a front camera 12 that captures an image of a view ahead of a host vehicle; a wheel speed sensor 14 that detects the speeds of four wheels of the host vehicle; a torque sensor 16 that detects a steering torque; and a computer 22 that controls a brake system 18 of the host vehicle and a motor 20 for assisting a steering operation, based on outputs from the front camera 12, the wheel speed sensor 14, and the torque sensor 16. Note that the computer 22 is an example of a task execution controller according to the invention.

The computer 22 includes a CPU 24, a RAM 26, a ROM 28, a display unit 32, and an input/output interface 34. The ROM 28 stores programs for executing a slot number calculation process routine and task execution process routines, which will be described later. The display unit 32 displays processing results. Through the input/output interface 34, outputs from the front camera 12, the wheel speed sensor 14 and the torque sensor 16 are input in the computer 22, and outputs from the computer 22 are sent to the brake system 18 and the motor 20. The CPU 24, the RAM 26, the ROM 28, the display unit 32, and the input/output interface 34 are connected to each other via a bus.

Figure 2:
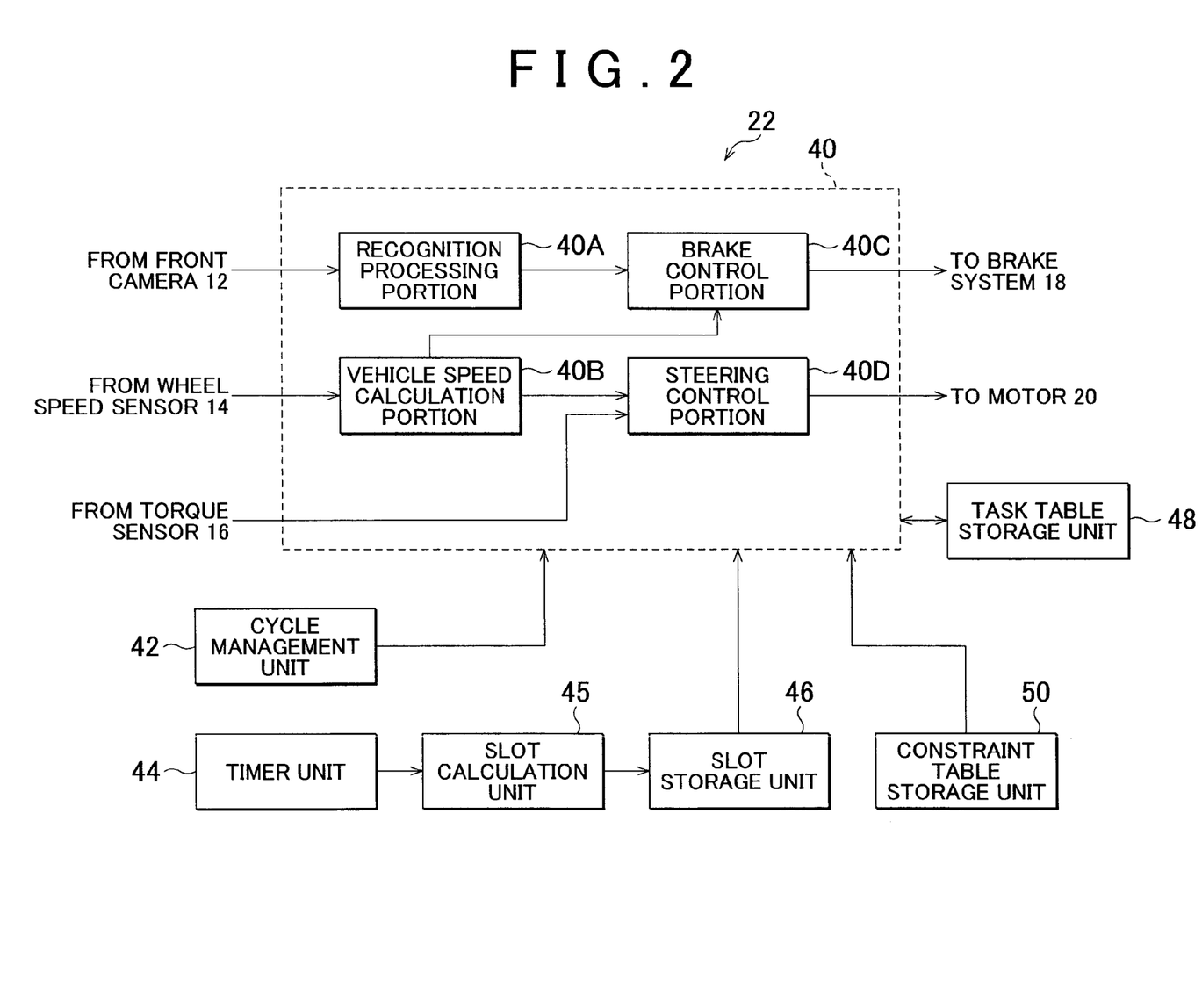
FIG. 2 is a block diagram showing the configuration of a computer of the integrated control system according to the embodiment of the invention.

The computer 22 is functionally configured as shown in FIG. 2. The computer 22 includes a multitasking unit 40, a cycle management unit 42, a timer unit 44, a slot calculation unit 45, a slot storage unit 46, a task table storage unit 48, and a constraint table storage unit 50. The multitasking unit 40 executes a plurality of control tasks in a multitasking manner. The cycle management unit 42 manages the control tasks such that each of the control tasks is activated periodically. The timer unit 44 measures a time. The slot calculation unit 45 calculates a current slot number at predetermined time intervals. The slot storage unit 46 stores the calculated current slot number. The task table storage unit 48 stores task tables in which slot numbers when respective control tasks are activated and slot numbers when respective task execution results are output are stored. The constraint table storage unit 50 stores constraint condition tables in which constraint conditions regarding inputs for the control tasks and outputs of the control task execution results are stored. Note that the slot storage unit 46 is an example of a first memory, and the task table storage unit 48 is an example of a second memory.

The multitasking unit 40 includes a recognition processing portion 40A, a vehicle speed calculation portion 40B, a brake control portion 40C, and a steering control portion 40D. The recognition processing portion 40A executes a control task of receiving a forward view image output from the front camera 12, executing recognition processing of the image of a preceding vehicle, and outputting, as an execution result, a result of recognition of the preceding vehicle. The vehicle speed calculation portion 40B executes a control task of receiving wheel speed data of the four wheels output from the wheel speed sensor 14, calculating the speed of the host vehicle, and outputting, as an execution result, vehicle speed data. The brake control portion 40C executes a control task of receiving the execution result obtained by the recognition processing portion 40A and the execution result obtained by the vehicle speed calculation portion 40B, determining contents of the control of the brake system 18, and outputting, as an execution result, a control signal for controlling the brake system 18 to the brake system 18. The steering control portion 40D executes a control task of receiving torque data output from the torque sensor 16 and the execution result obtained by the vehicle speed calculation portion 40B, determining a motor current for the motor 20, and outputting, as an execution result, a current control signal for controlling the motor current for the motor 20, to the motor 20.

The control tasks of the recognition processing portion 40A, the vehicle speed calculation portion 40B, the brake control portion 40C, and the steering control portion 40D are periodically executed in a multitasking manner, and the cycle of at least one of the control tasks is different from that of the other control tasks. The control tasks of the recognition processing portion 40A, the vehicle speed calculation portion 40B, the brake control portion 40C, and the steering control portion 40D are activated by the cycle management portion 42 in respective cycles set in advance.

In the present embodiment, the slot numbers calculated by the slot calculation unit 45 are the numbers assigned to respective slots obtained by dividing the time axis at 5 tick intervals (tick is a unit of time). The number of slots is set so as to be equal to a value obtained by dividing the least common multiple of the cycles of all the control tasks by the greatest common divisor of the cycles of all the control tasks and then multiplying the result of division by n (n is a natural number equal to or less than a predetermined value, and is not a large number; e.g., n=1). For example, when one cycle of each of the control tasks of the recognition processing portion 40A and the brake control portion 40C consists of 15 ticks and one cycle of each of the control tasks of the vehicle speed calculation portion 40B and the steering control portion 40D consists of 10 ticks, the number of slots is set to 6 that is obtained by dividing 30 ticks, which is the least common multiple of 15 ticks and 10 ticks, by 5 ticks, which is the greatest common divisor of 15 ticks and 10 ticks, and multiplying the result of division by 1. To be more general, when one cycle of task 1 is mp, one cycle of task 2 is mq, and one cycle of task 3 is mr (m, p, q, and r are natural numbers, and p, q and r are coprime), the least common multiple the cycles of these control tasks is mpqr and the greatest common divisor thereof is m. Thus, the number of slots is n times (n is a natural number) pqr (=mpqr/m) and the minimum value of the number of slots is pqr.

The slot calculation unit 45 calculates the current slot number, which becomes one of the slot numbers 0 to 5, and stores the calculated current slot number in the slot storage unit 46. For example, the slot calculation unit 45 adds 1 to the slot number stored in the slot storage unit 46 to update the slot number in the slot storage unit 46 at intervals of time corresponding to 1 slot. When the slot number stored in the slot storage unit 46 is the maximum value (5, for example), the slot number in the slot storage unit 46 is updated to the minimum value (0, for example).

When the control tasks of the recognition processing portion 40A, the vehicle speed calculation portion 40B, the brake control portion 40C, and the steering control portion 40D are activated and when the task execution results are output from these portions 40A, 40B, 40C and 40D, current slot numbers are read from the slot storage unit 46. Then, the read slot numbers are stored, as slot numbers at the time of activation of the control tasks (hereinafter, referred to as "activation-time slot numbers" where appropriate) and slot numbers at the time of output of control task execution results (hereinafter, referred to as "output-time slot numbers" where appropriate), in the corresponding task tables of the task table storage unit 48, as shown in FIGS. 3A to 3D.

Figure 3A:
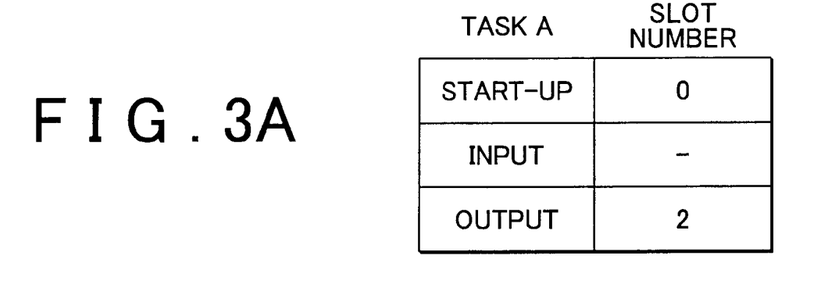
FIGS. 3A to 3D each show an example of a task table.
Figure 3B:
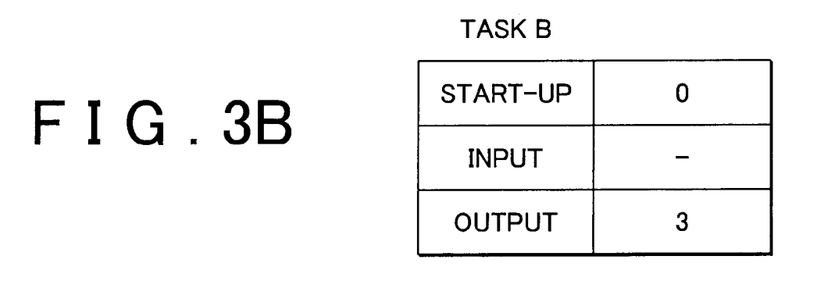
Figure 3C:
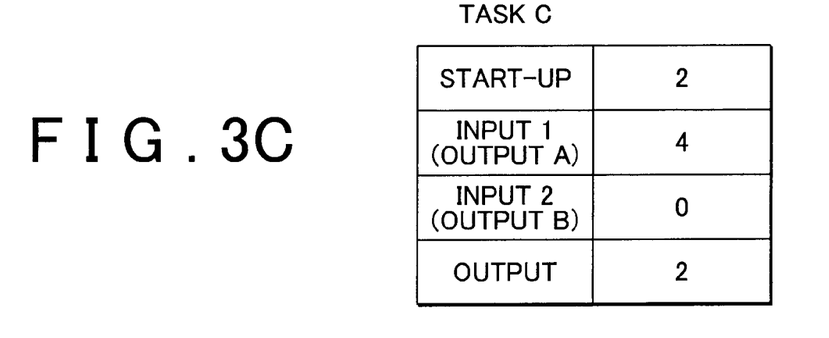
Figure 3D:
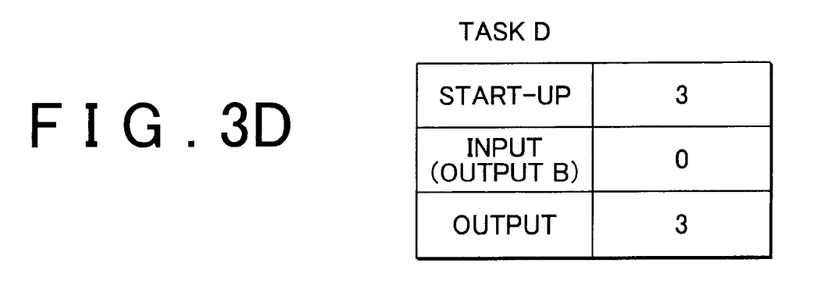

The control tasks of the brake control portion 40C and the steering control portion 40D are executed based on the execution results of other control tasks, which are input in the base control portion 40C and the steering control portion 40D. Slot numbers when the execution results of the other control tasks are output are read from the corresponding task tables of the task table storage unit 48. As shown in FIGS. 3C and 3D, the read slot numbers are stored, as slot numbers for the execution results that are input in the brake control portions 40C and the steering control portion 40D (hereinafter, referred to as "input slot numbers" where appropriate), in the corresponding task tables of the task table storage unit 48.

Figure 4A:
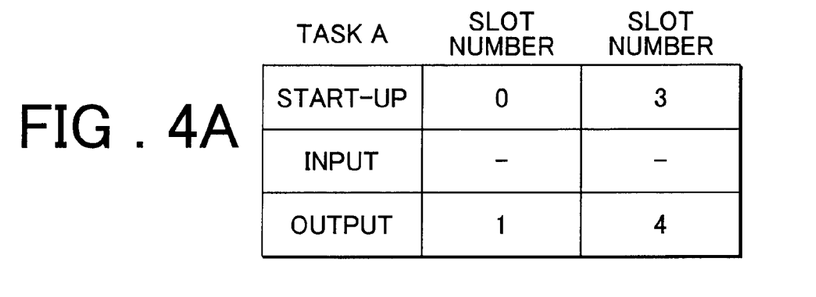
FIGS. 4A to 4D each show an example of a constraint table.
Figure 4B:
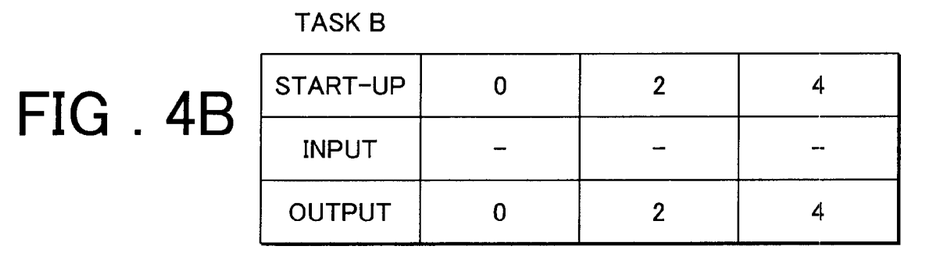
Figure 4C:
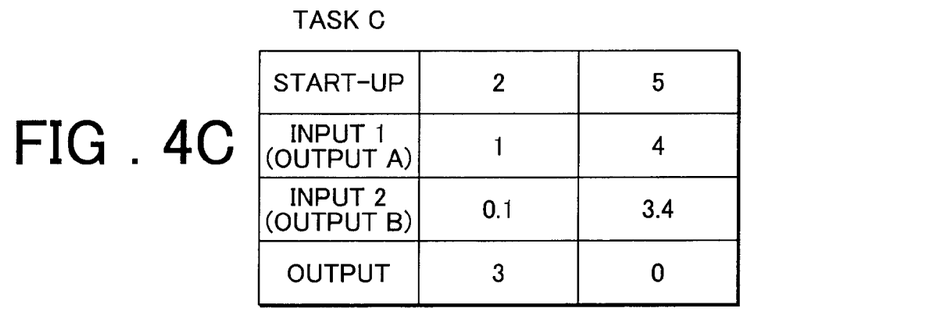
Figure 4D:
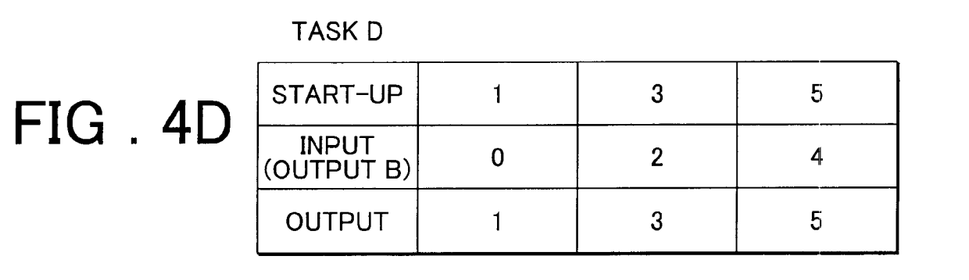

The constraint table storage unit 50 stores the constraint tables for the respective control tasks, as shown in FIGS. 4A to 4D. Each constraint table stores constraint conditions in which permissible input slot numbers and/or permissible output-time slot numbers that correspond to the respective activation-time slot numbers are set in advance. For example, as shown in FIG. 4C, in the case of the control task executed by the brake control portion 40C, when the activation-time slot number is 2, the permissible input slot number for the recognition result that is input in the brake control portion 40C (the permissible input slot number when the recognition processing portion 40A outputs the recognition result) is set to 1, the permissible input slot numbers for the vehicle speed data that is input in the brake control portion 40C (the permissible input slot numbers when the vehicle speed calculation portion 40B outputs the vehicle speed data) are set to 0 and 1, and the permissible output-time slot number when the brake control portion 40C outputs the execution result is set to 3. Further, in the case of the control task executed by the brake control portion 40C, when the activation-time slot number is 5, the permissible input slot number for the recognition result that is input in the brake control portion 40C is set to 4, the permissible input slot numbers for the vehicle speed data that is input in the brake control portion 40C are set to 3 and 4, and the permissible output-time slot number when the brake control portion 40C outputs the execution result is set to 0.

When outputting the execution result, each of the recognition processing portion 40A, the vehicle speed calculation portion 40B, the brake control portion 40C, and the steering control portion 40D reads the current slot number from the slot storage unit 46, reads the permissible output-time slot number for the execution result from the constraint table storage unit 50, and determines whether the read current slot number is the permissible slot number. If the read current slot number is not the permissible output-time slot number, it is determined that a time constraint violation has occurred, and a message indicating the occurrence of violation of the time constraint on the output of the task execution result is displayed on the display unit 32.

Each of the brake control portion 40C and the steering control portion 40D reads the input slot number, which is the slot number when an execution result of another control task is output, from the corresponding task table in the task table storage unit 48; reads the permissible input slot number from the constraint table storage unit 50; and determines whether the read input slot number is the permissible input slot number. If the read input slot number is not the permissible input slot number, it is determined that a time constraint violation has occurred, and a message indicating the occurrence of violation of the time constraint on the input for the execution of the control task, is displayed on the display unit 32.

Figure 5:
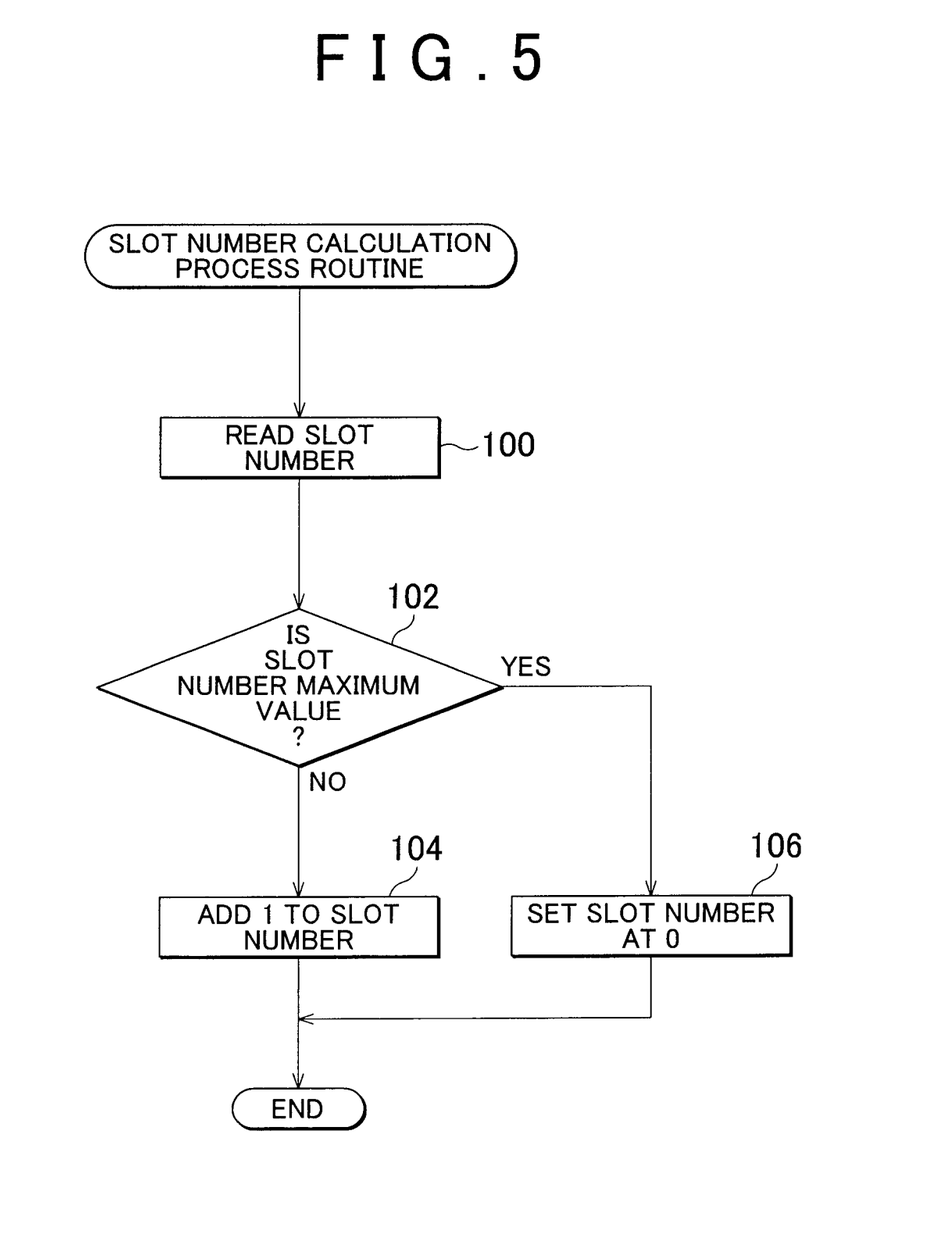
FIG. 5 is a flowchart showing a slot number calculation process routine executed in the integrated control system according to the embodiment of the invention.

Next, operations of the integrated control system 10 according to the present embodiment will be described. During traveling of the vehicle provided with the integrated control system 10, the slot number calculation process routine shown in FIG. 5 is executed in the computer 22 at intervals of time corresponding to 1 slot that is set in advance.

First, in step 100, the slot number is read from the slot storage unit 46. In step 102, it is determined whether the slot number read in step 100 is the maximum value. When the slot number is not the maximum value, in step 104, 1 is added to the read slot number and the resultant slot number is stored in the slot storage unit 46 so that the slot number is updated. Then, the slot number calculation process routine ends. On the other hand, when it is determined in step 102 that the read slot number is the maximum value, in step 106, 0 is stored in the slot storage unit 46 as the slot number so that the slot number is updated. Then, the slot number calculation process routine ends.

As described above, the slot number calculation process routine is executed at intervals of time corresponding to 1 slot, whereby the current slot number is stored in the slot storage unit 46.

Figure 6:
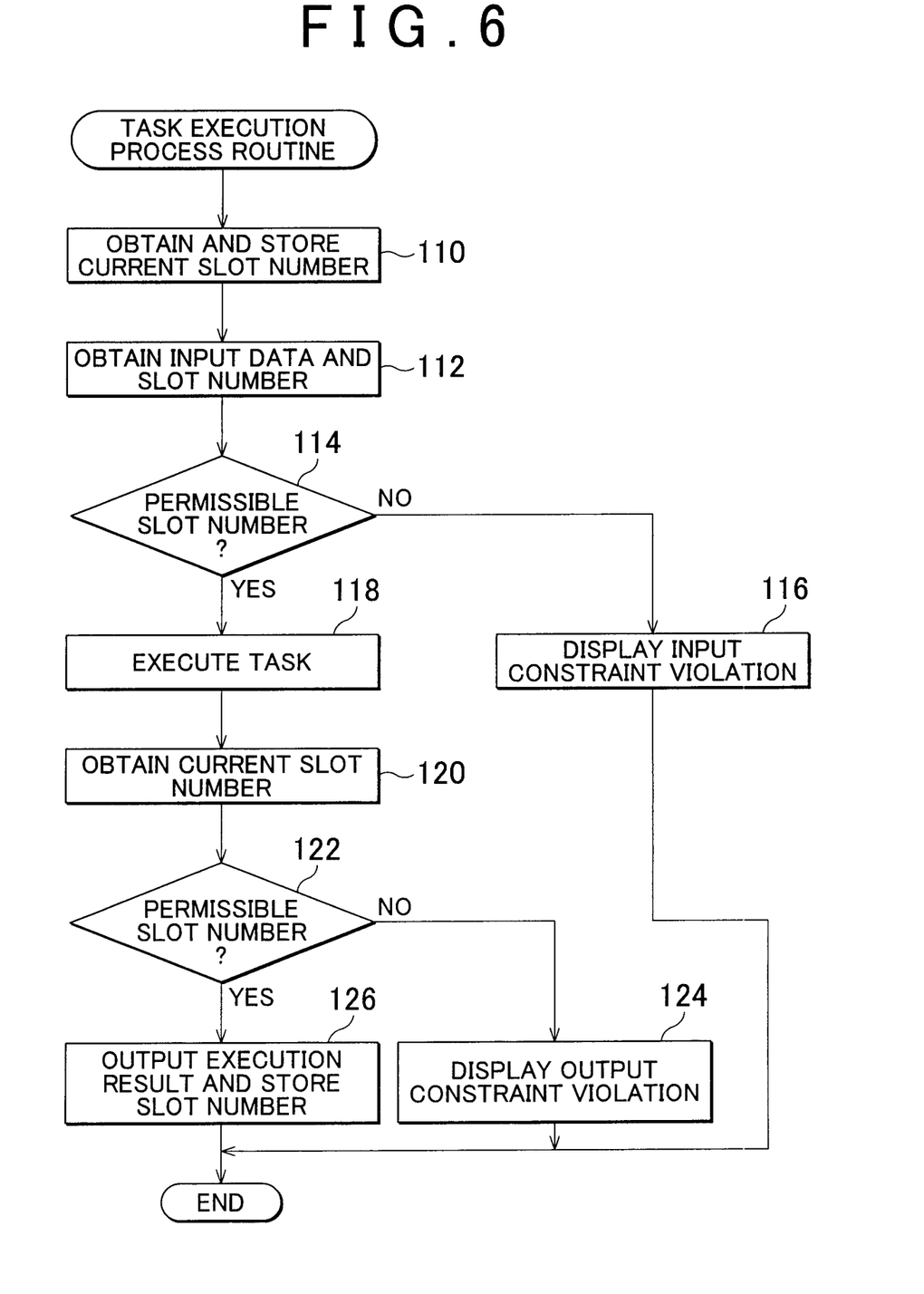
FIG. 6 is a flowchart showing a task execution process routine executed in the integrated control system according to the embodiment of the invention.

In parallel with execution of the slot number calculation process routine described above, the control tasks are activated periodically in a multitasking manner. When each control task is activated, the task execution process routine shown in FIG. 6 is executed. Note that the control tasks are activated by the cycle management unit 42 in accordance with the corresponding activation-time slot numbers stored in the constraint table storage unit 50.

First, in step 110, the current slot number is read from the slot storage unit 46 and is stored, as the activation-time slot number, in the task table storage unit 48. Next, in step 112, the execution result used as the input data for the activated control task is obtained from a memory (not shown), the slot number when the execution result of another control task, which is used as the input data, is output is obtained from the task table storage unit 48, and the obtained slot number is stored, as the input slot number, in the task table storage unit 48. When the input data is not the execution result of another control task, the input data is obtained from the front camera 12, the wheel speed sensor 14, or the torque sensor 16, the current slot number is read from the slot storage unit 46, and the read slot number is stored, as the input slot number, in the task table storage unit 48.

Then, in step 114, the permissible input slot number for the data for the activated control task is obtained from the constraint table storage unit 50, and it is determined whether the slot number obtained in step 112 is the permissible slot number. When it is determined that the obtained slot number is not the permissible slot number, it is determined that a time constraint violation has occurred, and in step 116, a message indicating the occurrence of violation of the constraint on the input for the activated control task is displayed on the display unit 32. Then, the task execution process routine ends.

On the other hand, when it is determined in step 114 that the slot number obtained in step 112 is the permissible slot number, the control task is executed in step 118 based on the input data obtained in step 112 so that the execution result is obtained.

In step 120, the current slot number is read from the slot storage unit 46. Then, in step 122, the permissible output-time slot number when the execution result of the activated control task is output is obtained from the constraint table storage unit 50, and it is determined whether the slot number read in step 120 is the permissible output-time slot number. When it is determined that the read slot number is not the permissible output-time slot number, it is determined that a time constraint violation has occurred, and in step 124, a message indicating the occurrence of violation of the constraint on the output of the control task execution result is displayed on the display unit 32. Then, the task execution process routine ends.

On the other hand, when it is determined in step 122 that the slot number read in step 120 is the permissible slot number, in step 126, the execution result obtained in step 118 is output and stored in the memory (not shown), and the slot number read in step 120 is stored, as the output-time slot number, in the task table storage unit 48. Then, the task execution process routine ends.

Figure 7:
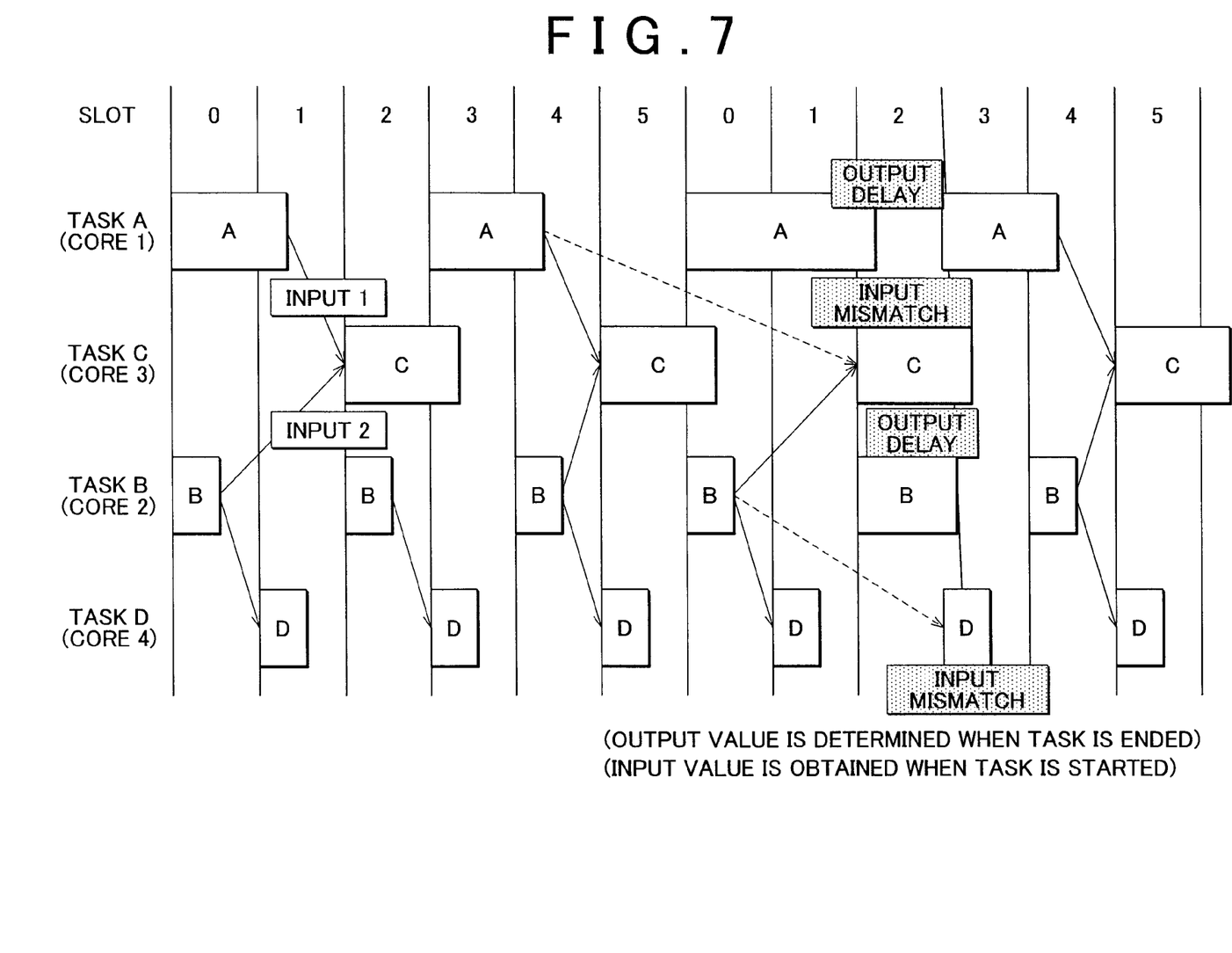
FIG. 7 shows an image diagram showing a state where multiple tasks are periodically executed in a multitasking manner.

When the task execution process routine described above is executed for each of the control tasks that are periodically executed in a multitasking manner, as shown in FIG. 7, for example, if output of the execution result of the control task of the recognition processing portion 40A, which is activated at the slot number 0 (see the third task A from left in FIG. 7), is delayed, the output-time slot number is 2, which is other than 1 that is the permissible output-time slot number (see FIG. 4A). Therefore, it is determined that a violation of the time constraint on the output of control task execution result has occurred. Further, due to the delay of the output of the execution result of the control task of the recognition processing portion 40A, the input-slot number for the data that is input in the brake control portion 40C for execution of the control task of the brake control portion 40C, which is activated at the slot number 2 (see the third task C from left in FIG. 7), is 4, which is other than 1 that is the permissible input slot number (see FIG. 4C). Therefore, it is determined that violation of time constraint on the input for the activated control task has occurred.

Also, if output of the execution result of the control of the vehicle speed calculation portion 40B, which is activated at the slot number 2 (see the fifth task B from left in FIG. 7), is delayed, the output-time slot number is 3 which is other than 2 that is the permissible output-time slot number (see FIG. 4B). Therefore, it is determined that a violation of time constraint on the output of the control task execution result has occurred. Further, due to the delay of the output of the execution result of the control task of the vehicle speed calculation portion 40B, the input-slot number for the data that is input in the steering control portion 40D for execution of the control task of the steering control portion 40D, which is activated at the slot number 3 (see the fifth task D from left in FIG. 7), is 0, which is other than 2 that is the permissible input slot number (see FIG. 4D). Therefore, it is determined that violation of time constraint on the input for the activated control task has occurred.

As described above, with the integrated control system according to the present embodiment, it is possible to determine by simple processing whether a violation of time constraint on the input for the control task has occurred, based on the slot number when the execution result of another control task, which is used as the input data, is output, and the permissible input slot number stored in the constraint table. It is also possible to determine by simple processing whether a violation of time constraint on the output of the control task execution result has occurred, based on the slot number when the execution result of the control task is output and the permissible output-time slot number stored in the constraint table.

Further, according to the present embodiment, memory consumption is reduced because data representation for the time constraint conditions is smaller as compared to a method in which, for each individual control task, time is measured by a timer and the measured time is compared with the constraint conditions to determine whether a time constraint violation has occurred. In addition, it is possible to determine whether the constraint conditions are satisfied, by referring to the current slot number and the slot number stored in the constraint table. This allows high-speed processing.

For each of the control tasks, it is only necessary to refer to the slot number and is unnecessary to read the time from the timer. Therefore, the speed of calculation process can be increased.

Because the slot number calculation process is common to all the control tasks, calculation time is reduced. By using the slot number that is a value having a small number of bits, the time required to refer to the slot number and the time required to refer to the constraint table are shortened, for each of the control tasks. Further, the storage capacity of the constraint table is reduced.

Note that in the embodiment described above, when it is determined that a violation of time constraint on the input for the control task has occurred, the control task is not executed and the task execution processing routine ends. However, the invention is not limited to the above embodiment. Even when it is determined that a violation of time constraint on the input for the control task has occurred, the control task may be executed.

Also, in the embodiment described above, when it is determined that a violation of time constraint on the output of the control task execution result has occurred, the execution result is not output and the control task execution processing routine ends. However, the invention is not limited to the above embodiment. Even when it is determined that a violation of time constraint on the output of the control task execution result has occurred, the execution result may be output.

Moreover, it may be determined only whether a violation of time constraint on the input for the control task has occurred, without determining whether a violation of time constraint on the output of the control task execution result has occurred. Alternatively, it may be determined only whether a violation of time constraint on the output of the control task execution result has occurred, without determining whether a violation of time constraint on the input for the control task has occurred.

Furthermore, in the embodiment described above, the invention is applied to the computer of the integrated control system installed in the vehicle. However, the invention is not limited to the above embodiment. The invention may be applied to devices that execute control tasks for other use. For example, the invention may be applied to a computer provided with a common operating system.

Even when it is determined that a time constraint violation has occurred, the control task may be executed while a message indicating the occurrence of the time constraint violation is recorded on a recording medium. In such a case, the message may be used later for analyzing the cause of occurrence of the time constraint violation.

Also, when it is determined that a time constraint violation has occurred, the control task may be executed while the control modes are appropriately switched depending on the content of the message.

In addition, the length of one slot may be a common divisor of all the task times, and the number of slots may be updated (reset) at every common multiple of all the task times. In this case, effects similar to the effects of the invention can be obtained.

What is claimed is:

1. A task execution controller in which a first control task and a second control task having different cycles are periodically executed based on input data in a multitasking manner, execution results of the first and second control tasks are respectively output, and the first control task is executed using the execution result of the second control task as the input data, the task execution controller comprising:
   a processor;
   a slot number calculation unit that calculates a current slot number based on the number of slots which are obtained by dividing a time axis at predetermined time intervals, the number of the slots being set to a value obtained by dividing a least common multiple of the cycles of the first and second control tasks by a greatest common divisor of the cycles of the first and second control tasks and then multiplying a result of division by a natural number n, and that stores the calculated current slot number in a first memory;

an output-time slot number storing unit that reads the current slot number stored in the first memory when each of the execution results of the first and second control tasks is output, and stores the read slot number in a second memory as a slot number at time of output of the execution result; and a determination unit that obtains, when the first control task that requires the execution result of the second control task as the input data is activated, the slot number at time of output of the execution result of the second control task from the second memory, and that determines whether a time constraint is violated based on the obtained slot number and an input constraint condition in which a permissible slot number for the input data for the first control task is set in advance.

2. The task execution controller according to claim 1, further comprising an output unit that outputs a determination result when it is determined that the time constraint is violated.

3. The task execution controller according to claim 1, wherein the determination unit reads the current slot number stored in the first memory when each of the execution results of the first and second control tasks is output, and determines whether a time constraint is violated based on the read slot number and an output constraint condition in which a permissible slot number for the output of the execution result of the control task is set in advance.

4. The task execution controller according to claim 3, further comprising an output unit that outputs a determination result when it is determined that the time constraint is violated.

5. A task execution controller in which a first control task and a second control task having different cycles are periodically executed based on input data in a multitasking manner, execution results of the first and second control tasks are respectively output, and the first control task is executed using the execution result of the second control task as the input data, the task execution controller comprising:

a processor;

a slot number calculation unit that calculates a current slot number based on the number of slots which are obtained by dividing a time axis at predetermined time intervals, the number of the slots being set to a value obtained by dividing a least common multiple of the cycles of the first and second control tasks by a greatest common divisor of the cycles of the first and second control tasks and then multiplying a result of division by a natural number n, and that stores the calculated current slot number in a memory; and a determination unit that reads the current slot number stored in the memory when each of the execution results of the first and second control tasks is output, and that determines whether a time constraint is violated based on the read slot number and an output constraint condition in which a permissible slot number for the output of execution result of the control task is set in advance.

6. The task execution controller according to claim 5, further comprising an output unit that outputs a determination result when it is determined that the time constraint is violated.

7. A non-transitory recording medium on which a program is recorded, the program causing a computer, in which a first control task and a second control task having different cycles are periodically executed based on input data in a multitasking manner, execution results of the first and second control tasks are respectively output, and the first control task is executed using the execution result of the second control task as the input data, to operate to:

calculate a current slot number based on the number of slots which are obtained by dividing a time axis at predetermined time intervals, the number of the slots being set to a value obtained by dividing a least common multiple of the cycles of the first and second control tasks by a greatest common divisor of the cycles of the first and second control tasks and then multiplying a result of division by a natural number n, and store the calculated current slot number in a first memory;

read the current slot number stored in the first memory when each of the execution results of the first and second control tasks is output, and store the read slot number in a second memory as a slot number at time of output of the execution result; and obtain, when the first control task that requires the execution result of the second control task as the input data is activated, the slot number at time of output of the execution result of the second control task from the second memory, and determine whether a time constraint is violated based on the obtained slot number and an input constraint condition in which a permissible slot number for the input data for the first control task is set in advance.

8. A non-transitory recording medium on which a program is recorded, the program causing a computer, in which a first control task and a second control task having different cycles are periodically executed based on input data in a multitasking manner, execution results of the first and second control tasks are respectively output, and the first control task is executed using the execution result of the second control task as the input data, to operate to:

calculate a current slot number based on the number of slots which are obtained by dividing a time axis at predetermined time intervals, the number of the slots being set to a value obtained by dividing a least common multiple of the cycles of the first and second control tasks by a greatest common divisor of the cycles of the first and second control tasks and then multiplying a result of division by a natural number n, and store the calculated current slot number in a memory; and read the current slot number stored in the memory when each of the execution results of the first and second control tasks is output, and determine whether a time constraint is violated based on the read slot number and an output constraint condition in which a permissible slot number for the output of execution result of the control task is set in advance.

* * * * *